United States Patent [19]

White

[11] 3,833,406

[45] Sept. 3, 1974

[54] CLOSED CONTAINER WITH DESICCANT COATING ON INSIDE SURFACE THEREOF

[75] Inventor: Paul L. White, Toledo, Ohio

[73] Assignee: Owens-Illinois, Inc., Toledo, Ohio

[22] Filed: Aug. 7, 1972

[21] Appl. No.: 278,402

[52] U.S. Cl............... 117/97, 117/95, 117/121, 117/123 A, 117/124 A, 252/194
[51] Int. Cl............................................. B65d 23/02
[58] Field of Search.. 117/95, 124 A, 124 T, 123 A, 117/121, 97; 215/1 C; 252/194

[56] References Cited
UNITED STATES PATENTS

| | | | |
|---|---|---|---|
| 2,832,701 | 4/1958 | Miskel | 117/124 A X |
| 2,885,746 | 5/1959 | Gura | 252/194 X |
| 2,995,463 | 8/1961 | Meister et al. | 117/124 A X |
| 3,175,117 | 3/1965 | Kardos | 117/124 A X |
| 3,326,810 | 6/1967 | Dolan et al. | 252/194 |
| 3,552,992 | 1/1971 | Self et al. | 117/124 A X |
| 3,736,172 | 5/1973 | Delano et al. | 117/95 |

*Primary Examiner*—Ralph Husack
*Attorney, Agent, or Firm*—Henry P. Stevens; Edward J. Holler

[57] ABSTRACT

Good desiccant coatings can be obtained on the inside surface of a closed container such as glass, ceramic, plastic or metal by applying thereto a nonparticulate, thin film about 10 microns thick consisting essentially of aluminum monohydrate, alumina, silica or oxides of titanium, zirconium, thorium, magnesium and calcium or combinations thereof dispersed in an aqueous medium and activating said coating by heat or vacuum.

7 Claims, No Drawings

CLOSED CONTAINER WITH DESICCANT COATING ON INSIDE SURFACE THEREOF

BACKGROUND OF THE INVENTION

There are many known desiccants such as phosphorus pentoxide, magnesium sulfate, calcium oxide, silica gel, barium oxide and aluminum oxide which are used to dry various liquids, solids and gases. However, these desiccants are normally particulate solids and do not lend themselves well to applications as thin, coherent films on a solid surface.

One common method of controlling humidity in a closed glass container filled with a solid such as a drug which is sensitive to moisture is to place a plug of cotton or silica gel in the top thereof. However, the cotton requires special handling in that it must remain sterile whereas with silica gel there is always the danger that it might be ingested by a child or senile adult.

Another important application of desiccants is in semi-conductor devices since it is well known that the atmosphere surrounding such a device, for example a transistor, affects both performance and stability. A method of controlling the atmosphere in such devices is described in U.S. Pat. No. 3,487,275 wherein a transistor is encapsulated in a hermetically sealed envelope and boron anhydride glass which acts as a desiccant is fused to the interior of the envelope. U.S. Pat. No. 3,668,004 discloses a semi-conductor device comprising a silicon substrate, an insulating film and a protective coating of $Al_2O_3$ on the insulating film.

In the past, various coatings such as tin, titanium and silica, for example, have been applied to the exterior surface of glass and other types of containers as extremely thin films on the order of one micron or less to improve scratch resistance and lubricity. However, these films were too thin to have any appreciable desiccant properties.

The main object of this invention is to provide a closed container with a nonparticulate, adherent film on the inside surface thereof consisting essentially of aluminum monohydrate, alumina, silica or other metallic oxides which film has a high surface area and will absorb water from the surrounding atmosphere.

SUMMARY OF THE INVENTION

It has now been discovered that aluminum hydrates, alumuna, silica and oxides of titanium, zirconium, thorium, magnesium and calcium and combinations thereof can be dispersed in an aqueous medium and applied to the inner surface of a glass, ceramic, or metal container by rinsing, dipping or spraying to form a thin, high surface area film at least 2 microns thick which when air dried is adherent, coherent and transparent and acts as a desiccant. Preferably, the coated container is fired at a temperature of from 200° to 400° C. to remove any volatile material such as water or organic matter from the film. The article thus formed is also an integral part of the present invention.

GENERAL DESCRIPTION OF THE INVENTION

The action of a desiccant is dependent upon the attractive force of the absorbent and the amount of surface area available. Activated aluminas and silica gels are excellent high surface area desiccants because of their inertness, resistance to swelling and sorptive capacity. These materials possess a high surface per unit mass which enables them to absorb water vapor from the surrounding atmosphere.

Various forms of alumina, titania, thoria or silica as colloidal dispersions in water can be used to form the non-particulate, coherent films of this invention. A typical form of alumina is Dispal sold by the Continental Oil Company of Tulsa, Oklahoma which contains by weight 90 percent of alumina monohydrate, 9 percent water, 0.5 percent carbon and minor amounts of silicon dioxide, iron oxide, sodium oxide and sulfur. Dispal which is a white powder has a particle size of from 45 to 90 microns and a surface area of 320 square meters per gram. Another form of alumina which can be used in colloidal form is described in the copending application of Bulent Yoldas, U.S. Ser. No. 234,303, filed Mar. 13, 1972 which is assigned to the assignee of the present application. Both of these aluminas are prepared by the hydrolysis of an aluminum alkoxide such as aluminum isopropoxide.

Either of the above forms of alumina can be readily dispersed in water to form dispersions containing from 5 to 25 percent by weight of solid alumina. Generally, about 0.8 percent by weight of concentrated hydrochloric acid on a total dispersion basis is added to the water and then the alumina is added with moderate agitation for about 15 minutes. If desired, acetic acid or nitric acid can be used to disperse the alumina although for dispersions greater than 10 percent by weight more acid may be required.

Another form of alumina dispersion which may be used in the practice of the present invention is Cab-O-Grip sold by the Cabot Corporation of Boston, Massachusetts. Aqueous concentrations containing up to 30 percent solids produce good films when acid is added to maintain the pH below 4.5.

The aqueous dispersions can be applied to various substrates by dipping, washing, rinsing and preferably by spraying. The film thus formed is allowed to air dry to transform it into an adherent, coherent, transparent coating. Calcination to about 500° C. for about 10 minutes transforms the film into a crystalline, refractory oxide species and removes all organics as well as water. Glass or ceramic is the preferred substrate but metals such as iron, magnesium or aluminum and other materials such as plastics, wood and the like can also be coated if desired.

Aluminum hydrate or oxide films formed from aqueous solutions are quite porous and have relatively high surface areas. Dispal films, for example, exhibit pores in the range of 75 to 150 Angstroms and surface areas of from 20 to 320 square meters per gram. When activated at room temperature and under vacuum or by further heating, the film becomes transparent and is capable of adsorbing water vapor from the surrounding atmosphere similar to silica gel. Films made from Dispal solutions when heated at 500° C. for 10 minutes are converted to gamma alumina and are rigidly attached to most substrates. Dispersible aluminas of the type contemplated in this invention adsorb about 15 percent of their own weight in water at 25° C. and 40 percent relative humidity.

When alumina is applied to the interior of a glass container, the film is transparent and acts as a desiccant thus keeping the contents dry and avoiding accidental ingestion as sometimes occurs with plugs of silica gel. The alumina films can be applied without special processing. After a glass bottle is formed, the aqueous dispersion of alumina can be sprayed on the inside surface and subsequently heated to activate the film thus formed. Thereafter, the film can be subjected to sterilization or even higher temperatures without harmful effects. If desired, the glass bottle can simply be rinsed with the alumina solution and allowed to drain whereby the film formed is dried with air. Care must be exercised when drying above 100° C. to avoid fracture of the film and possible delamination from the surface. Good results are obtained when the drying is carried out at a rate of about 2° C. rise in temperature per minute.

The application of a nonparticulate, adherent film capable of acting as a desiccant is also desirable when encapsulating microelectronic devices. Aqueous dispersions of alumina can be applied as a thin film less than 20 microns thick on the lid of an alumina package containing an electronic element such as a transistor or micro-circuit to maintain a low water vapor condition. The films thus formed cannot be removed by air attrition, mechanical vibration or thermal shock.

As previously stated, silica can also be employed as a colloidal dispersion in water for applying transparent, non-particulate, thin films to glass, metal, wood and plastic substrates. A typical form is Ludox sold by E. I. Dupont de Nemours and Company of Wilmington, Delaware. Aqueous dispersions containing up to 30 percent of solid silica provide good coatings. If desired, one can employ tetraethylorthosilicate sold under the tradename of Silbond by Stauffer Chemical Company, Weston, Mich. This form of silica is hydrolyzed by adding two moles of water per mole of ethyl silicate at room temperature to obtain a clear fluid which when applied as a coating and heated produces a transparent, nonparticulate film having a surface area of up to 950 square meters per gram.

Combinations of alumina such as Dispal and silica such as Ludox or Silbond are likewise considered to be within the scope of the present invention in that they alter the sorptive capacity of the resulting coating. Thus, a coating containing from 75 to 90 percent by weight of silica and from 25 to 10 percent by weight of alumina when heated to 800° C. will have a surface area of about 400 square meters per gram compared to less than 10 square meters per gram for a coating formed from 100 percent silica heated at the same temperature.

Aqueous dispersions of titania in colloidal form alone or in combination with alumina are equally useful in practicing this invention. For example, titanium tetrapropoxide can be hydrolyzed with water to form a coating composition containing from 1 to 25 percent by weight of titania. Satisfactory, clear coatings are obtained when a glass substrate is sprayed with a titania dispersion containing from 10 to 20 percent by weight of solids and heated to 300° C. Similar results are observed when equal amounts of titania and alumina are used as a coating on metal or glass. In either case, the coating is a desiccant and readily forms a nonparticulate film which adsorbs water.

In like manner, the oxides of thorium, zirconium, magnesium and calcium can be used alone or in combination as aqueous dispersions in concentrations of up to 15 percent by weight of said oxides to apply films to various substrates previously enumerated which films act as desiccants and readily adsorb moisture from the surrounding atmosphere. Metallic salts such as thorium or zirconium nitrate or calcium or magnesium acetate are generally dispersed in water to form the corresponding metal oxides.

The following examples set forth in more detail the best mode now contemplated for carrying out the present invention.

DESCRIPTION OF THE PREFERRED EMBODIMENTS

EXAMPLE 1

The inside of a glass bottle of 50 milliliter capacity was rinsed with an aqueous dispersion containing 10 percent by weight of alumina (DISPAL) and allowed to drain. After air drying over night, the bottle was dried in an oven at 100° C. for 4 hours, then placed in a furnace and pyrolyzed at 400° C. for 30 minutes. The bottle was weighed upon removal from the furnace and allowed to sit for 24 hours at 25° C. and 25 percent relative humidity. The bottle was then weighed again and the transparent film formed was found to adsorb about 25 milligrams of water vapor.

EXAMPLE 2

A glass bottle of 50 milliliter capacity was coated on the inside surface by rinsing with an aqueous dispersion containing 25 percent by weight of an alumina prepared by the hydrolysis of aluminum secondary butoxide. The coated bottle was air dried, then oven dried at 100° C. and finally pyrolyzed at 400° C. as described in Example 1. Upon exposure to an atmosphere of 25 percent relative humidity at 25° C. for 24 hours, the film on the inside surface of the bottle adsorbed 42 milligrams of water with no cracking, spalling, delamination or crazing of said film.

EXAMPLE 3

An aqueous dispersion of the alumina employed in Example 2 was made by dispersing 6.5 percent by weight in water containing about 1 percent of acetic acid and stirring for 20 minutes. The interior of a glass container of about 100 ml. capacity was sprayed with the alumina solution to the point of run off. The container was dried in an oven at 100° C. for 12 hours to clarify the film formed. After exposure of the bottle in a 50 percent humidity chamber for 64 hours, the film on the inside surface was found to adsorb 9.4 milligrams of moisture.

EXAMPLE 4

A 10 percent by weight dispersion of aluminum monohydrate was prepared by dispersing Dispal alumina powder in water containing 0.8 percent hydrochloric acid and stirring for 20 minutes. About 0.11 milligrams of the resulting solution was placed in an integrated circuit alumina lid in an area of 3 milllimeters in diameter. Upon drying at room temperature, a thin film of aluminum monohydrate formed which was fired slowly to 500° C. for 30 minutes to remove volatile material and convert the film to gamma alumina. This film adsorbed 22 micrograms of water vapor at 40 percent relative humidity and 25° C. under controlled vacuum conditions.

EXAMPLE 5

A portion of the Dispal aluminum monohydrate solution prepared in Example 4 was heated at the boiling temperature until a gel formed. A small amount of the gel was transferred to an alumina lid, then dried and fired as in the preceding example. The thin film of adherent gamma alumina was found to adsorb about 16 percent of its own weight of water vapor in a controlled atmosphere of 40 percent relative humidity at a temperature of 25° C.

EXAMPLE 6

A 25 milliliter glass vial was rinsed with an aqueous solution of 10 percent thorium oxide made by dispersing thorium nitrate in water. The film which formed on the inside surface of the vial was air dried and then fired to 300° C. for 3 hours. This film was transparent, well adhered to the glass substrate and adsorbed 14 percent of its own weight in water at 50 percent relative humidity and room temperature.

EXAMPLES 7 – 12

Various combinations of the oxides previously mentioned were dispersed in water at different concentrations and applied by rinsing to the inside surface of 25 ml. glass vials. The resulting films were air dried and subsequently heated at 300° C. for one hour, then placed in a controlled atmosphere at 24° C. and 50 percent relative humidity to determine how much moisture was adsorbed by each film. The pertinent data is tabulated below.

| Composition | Concentration % by wt. | Water Gain in mgs. |
|---|---|---|
| 90% $ThO_2$ and 10% $ZrO_2$ by wt. | 10 | 7 |
| 99% $ThO_2$ and 1% $SiO_2$ by wt. | 10 | 7 |
| 95% $Al_2O_3$ and 5% $ThO_2$ by wt. | 11 | 9 |
| 95% $Al_2O_3$ and 5% $ZrO_2$ by wt. | 11 | 7 |
| 99% $Al_2O_3$ and 1% CaO by wt. | 3.8 | 6 |
| 99% $Al_2O_3$ and 1% MgO by wt. | 3.8 | 7 |

The desiccant coatings in all the foregoing examples were at least two microns thick and averaged about 10 microns in thickness.

What is claimed is:

1. An article of manufacture comprising a closed container of glass or ceramic having a transparent, non-particulate desiccant coating at least two microns thick on its entire interior surface, said desiccant coating consisting essentially of a member of the group consisting of aluminum monohydrate, and the oxides of aluminum, thorium, zirconium, magnesium or calcium and combinations thereof.

2. An article of manufacture as in claim 1 in which the container is glass and the desiccant coating is alumina.

3. An article of manufacture as in claim 1 in which the container is alumina and the desiccant coating is aluminum monohydrate.

4. An article of manufacture as in claim 1 in which the container is glass and the desiccant coating is thoria.

5. An article of manufacture as in claim 1 in which the container is glass and the desiccant coating is a combination of zirconia and thoria.

6. An article of manufacture as in claim 1 in which the container is glass and the desiccant coating is a combination of alumina and calcium oxide.

7. An article of manufacture as in claim 1 in which the container is glass and the desiccant coating is a combination of alumina and magnesium oxide.

* * * * *